April 23, 1946.  H. ZIEBOLZ  2,398,987
APPARATUS FOR CONTINUOUSLY PREDICTING A TREND IN OBSERVED DATA
Filed May 23, 1942  3 Sheets-Sheet 2
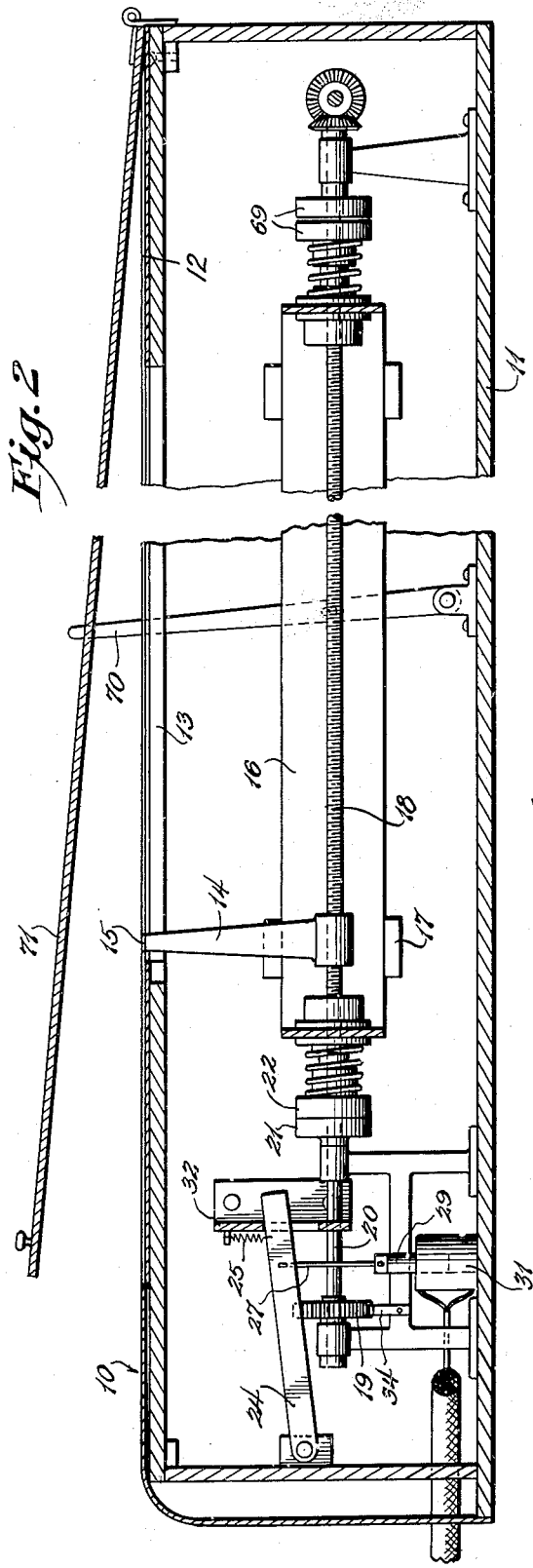
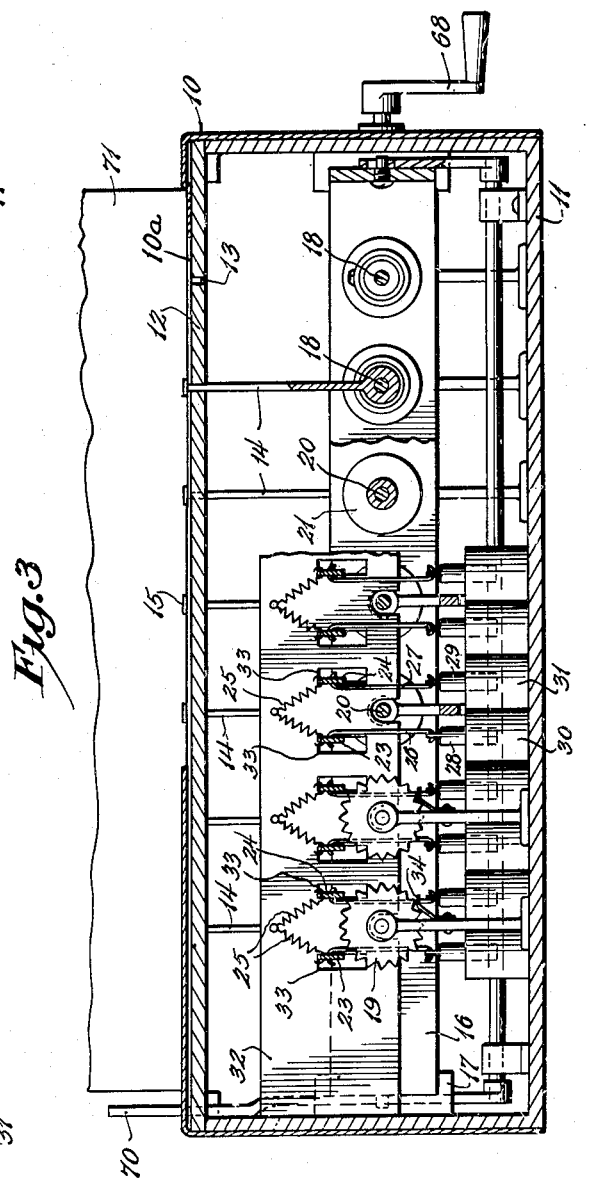
Inventor
Herbert Ziebolz
By A. D. Adams
Attorney April 23, 1946. H. ZIEBOLZ 2,398,987
APPARATUS FOR CONTINUOUSLY PREDICTING A TREND IN OBSERVED DATA
Filed May 23, 1942 3 Sheets-Sheet 3
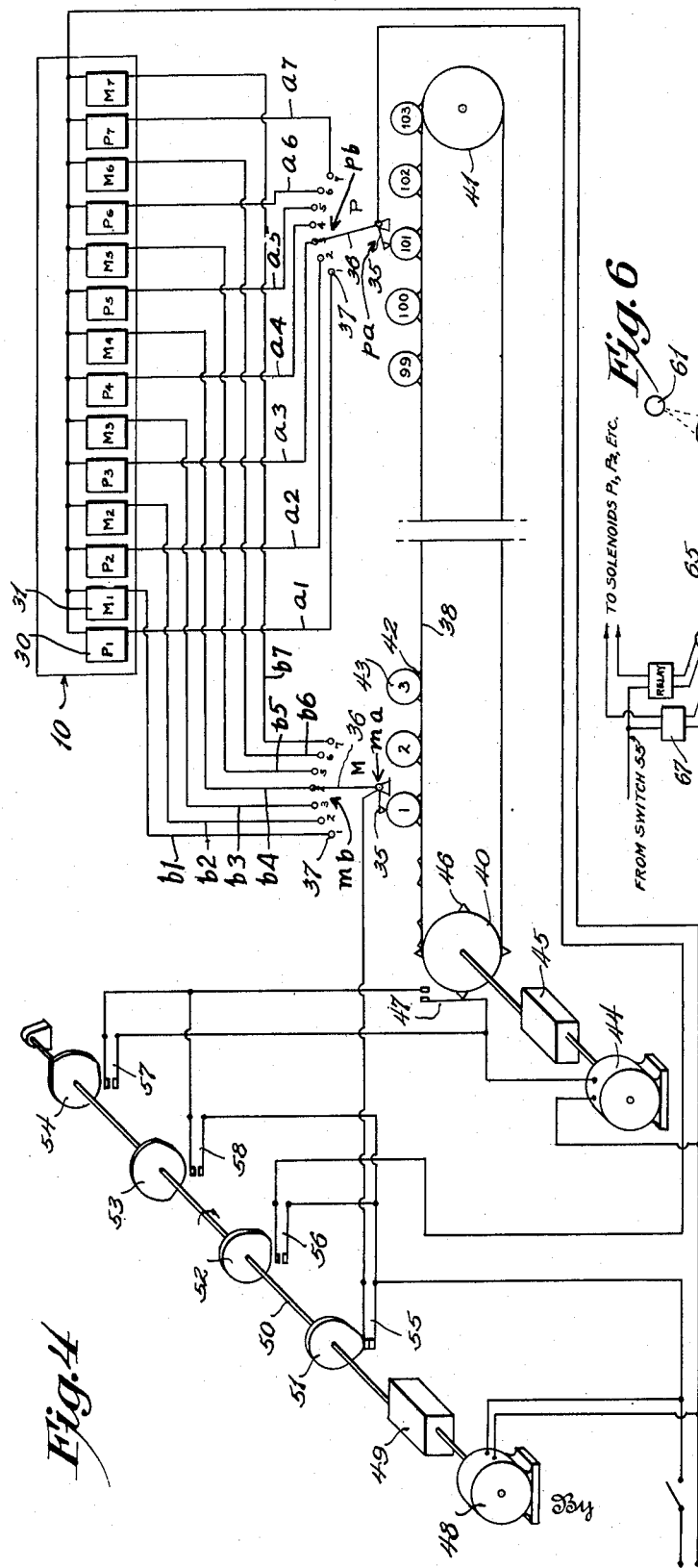
Inventor
Herbert Ziebolz
By A. D. Adams
Attorney Patented Apr. 23, 1946

2,398,987

UNITED STATES PATENT OFFICE 2,398,987

APPARATUS FOR CONTINUOUSLY PREDICTING A TREND IN OBSERVED DATA

Herbert Ziebolz, Chicago, Ill., assignor to Askania Regulator Company, Chicago, Ill., a corporation of Illinois Application May 23, 1942, Serial No. 444,234

16 Claims. (Cl. 177—311)

The invention relates generally to apparatus for detecting a trend in observed data and more particularly to apparatus for continuously indicating a trend, that is, indicating the trend at the current time.

As more fully disclosed in my copending application Serial No. 436,020, filed March 24, 1942, and, particularly, my copending application Serial No. 478,772, filed March 11, 1943, it is known that if some variable characteristic of a plurality of like natural objects, such as the height or weight of men or women, the size or weight of eggs or rain drops, and so forth, is subdivided into a plurality of equal ranges of a measure of that characteristic and ranged along the abscissa axis of a graph, and the number of objects whose observed characteristic falls within each range are plotted as ordinates on that graph, there results a typical distribution, for example, the so-called normal or probability curve. As stated, in the above mentioned applications, I have discovered that manufactured or processed articles or products when similarly observed and the data plotted produce a generally similar curve. A line drawn through the apex or maximum value of such a normal curve and parallel with the ordinate axis indicates the true average of the objects or specimens observed and the curve shows the distribution of the specimens to one side or the other of the true average value.

The extremities of such a normal curve theoretically continue to infinity and thus are approximately parallel with the abscissa axis. The extremities also lie very close to the abscissa axis because the relative number of specimens that fall within the ranges remote from the true average are few. Since the normal curve is characterized by a rather steep-sided midportion and rapidly flattening extremities, even the number of specimens falling in ranges comparatively close to the true average are few. It follows, therefore, that variation in the number of specimens falling in the more remote ranges would be comparatively minor, and such variations would be difficult of detection by change in the graph at the flattened portions representing these ranges. If thus in a manufacturing operation the finished products are periodically sampled and tested only for the extreme over or under sizes, for example, the possibility of detecting any deviation from desired or given specifications would be remote and very retarded.

Further, as stated in my above mentioned applications, I have found, however, that for a very small change in the ordinate value of a normal curve at or near its flattened portion, there is a very large change in the ordinate value of a point near the true average value, and that, likewise, there is a comparatively large lateral shift of the true average value, that is, of the line drawn through the apex of the curve and parallel with the ordinate axis. Utilization of the above fact in observing or predicting trends in observed data, and especially in manufacturing operations, and the provision of a new method of prediction and control based on this fact is the basis of my above mentioned applications, and also of this application.

In my above mentioned applications, however, provision was made only for a discontinuous or periodic prediction or observation of a trend in the observed data. It is the primary object of this invention to provide a new and improved apparatus whereby a continuous indication or prediction of a trend is obtained.

A more particular object of the invention is to obtain a continuous and current indication of a trend in observed data by maintaining a graph, of the character heretofore described, that is always representative of a given number of the latest data observed.

A further object is to provide new and improved apparatus for automatically maintaining a graph, of the character heretofore described, representative of a given number of the latest observed data.

Still another object is to provide new and improved apparatus for automatically maintaining a graph, of the character heretofore described, constantly composed of a given number of data with means for continuously modifying the graph by successively incorporating therein new data and at the same time removing data therefrom in the order of initial incorporation and at the rate of incorporation of new data, to maintain the graph representing the last given number of data recorded.

Still a further object is to provide an apparatus particularly adapted for indicating a trend in a manufacturing operation, designed to produce products required to have at least one characteristic fall within specified limits, and having means for presenting the manufactured products in the order of their completion, a first means checking each product presented as to the particular characteristic, a means automatically classifying the data so observed and indicating into which of a plurality of equal ranges of a measure of the characteristic the data falls, mechanical graphing means automatically actuated by the classifying means additively recording the data supplied, and a second checking and classifying means coming into operation after a given number of products have been checked by the first means and operatively associated with the graphing device automatically and successively to subtract from the graphing device the data added by the first means, such subtraction of data occurring one for each addition above the given number of products and occurring in the order of addition of the data.

Other aims and advantages of the invention will appear in the specification, when considered in connection with the accompanying drawings, wherein:

Fig. 2 is a longitudinal sectional view taken on the line 2—2 of Fig. 1;

Fig. 3 is a sectional view taken on the line 3—3 of Fig. 1;

Fig. 4 is a diagrammatic view, including a wiring diagram, of mechanism for automatically operating the machine shown in Fig. 1;

Fig. 5 is a fragmentary perspective view of one of the gauges shown in Fig. 4;

Fig. 6 is a fragmentatry perspective view showing optical means for operating the machine; and Fig. 7 is a fragmentary view of the mechanism shown in Fig. 6.

Figure 1:
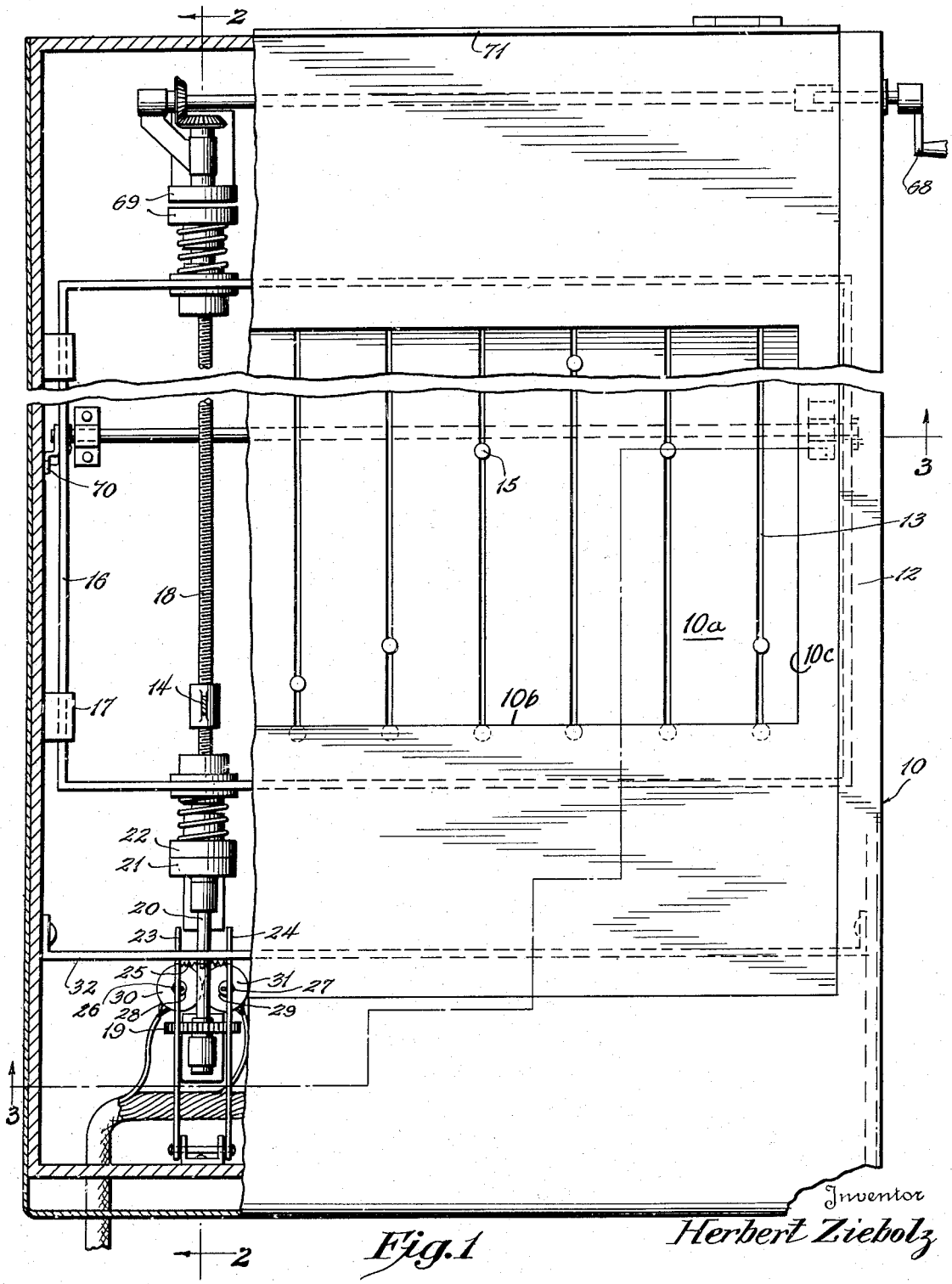
Fig. 1 is a top plan view, partly in section, of a machine embodying the invention.

For purposes of disclosing the invention, the method thereof will be described as employed to detect a trend in a manufacturing operation and the apparatus, likewise, will, for illustrative purposes, be shown as embodied in a mechanism particularly adapted for use in continuously indicating a trend in a manufacturing operation. It is to be understood, however, that the invention is not limited to the particular embodiment shown or to the particular application of the invention here mentioned, but that the exemplary embodiment is for purposes of disclosure only.

As herein shown, the apparatus comprises generally a graphing device of the general type disclosed and claimed in my copending application Serial No. 436,020, filed March 24, 1942. Operatively associated with the graphing device is a first article or product measuring or testing and data classifying means, generally designated P, functioning additively to incorporate data in the graph formed by the graphing device as the articles or products are presented, in the order of their manufacture, to this means by a suitable conveyor mechanism. Also operatively associated with the graphing device is a second article or product measuring or testing and data classifying means, generally designated M, which is, however, so associated with the graphing device as to subtract data from the graphing device. The means P and M are so arranged that the means M comes into play only after the graphing device has been actuated a given number of times by the means P, the means P and M being further arranged to maintain this given number of data in the graph, with the subtraction of data being in the order of the addition of data to the graph.

The graphing device is incorporated in a box-like metal casing or housing 10 having a base 11 and a top plate 12. The top plate has a rectangular sub-depressed portion 10a, the lower marginal edge 10b of which may be considered as subdivided into a plurality of equal divisions representing ranges of some measure of a characteristic, dimension, or the like. This marginal edge 10b may be considered as the abscissa axis of a coordinate axis graph, the ordinate axis being represented by the side marginal edge 10c. Formed in the plate 12 are a plurality of parallel, equally spaced slots 13 parallel with the marginal edge 10c and each representing the midpoint of one of the ranges or divisions of the marginal edge 10b. The sub-depressed portion 10a may thus be considered as presenting a chart face with the slots 13 forming predetermined abscissa values.

Housed within the casing and projecting through and movable longitudinally in each slot 13 is an indicating finger 14 having an exposed head 15. The heads 15 are centered with respect to the slots 13 in order that they may represent the same properly spaced abscissa values represented by the slots 13. Herein these fingers are adapted to be actuated automatically, though it will be appreciated that manual actuating means might readily be provided if such manual actuating means proved desirable. Each finger 14 at any given instant in the operation of the graphing device represents the relative ordinate value for the abscissa value determined by the slot in which the particular finger 14 operates, and thus indicates the number of units of data or the number of articles, when, as herein, the invention is applied to a manufacturing process, whose observed characteristic or measurement falls within a particular one of the plurality of ranges into which a measure of the variable characteristic of the article has been subdivided. The exposed heads on the fingers thus outline a graph showing the distribution of the products. This graph may be compared with a desired or ideal curve or with a later produced graph.

In this instance, the mechanism for operating the fingers includes a rectangular frame 16 capable of longitudinal movement in guides 17 at the opposite sides of the casing. Rotatably mounted in the frame 16 are a series of screw threaded shafts 18, one associated with each finger 14, which are operated step by step to advance or retract the fingers a definite amount for each impulse given to the shafts. Each of the shafts is adapted to be rotated a predetermined amount by means of a ratchet wheel 19 mounted on a separate operating shaft 20 shown as having a clutch disk 21 coacting with spring urged clutch member 22 on the end of each shaft 18 projecting through the front end of the frame 16.

Each of the ratchet wheels is adapted to be operated by either of a pair of pivoted levers or pawls 23 and 24 normally held out of engagement with the teeth on the wheels by tension springs 25. They are shown as being connected by links 26 and 27 to the cores 28 and 29 of adjacent pairs of solenoids 30 and 31, each pair being arranged below a ratchet wheel so that they act to pull down on the levers or pawls and impart rotation to the respective operating shafts. Incidentally, the levers are arranged on opposite sides of the vertical center line of each of the ratchet wheels to turn the shafts 20 in opposite directions and they are capable of both vertical and lateral movement within the limitation of their strokes. They are guided for such movement in a vertical guide bracket 32 having relatively wide slots 33 and the tension springs 25 are connected to the bracket. Each of the ratchet wheels is restrained against rotation by a spring detent 34. Consequently when one of a pair of solenoids, herein 30, is energized, the corresponding finger 14 is advanced, while energization of the other of a pair of solenoids, herein 31, results in a retraction of the corresponding finger. Thus, depending upon which solenoid is energized, it may be said that data is added to or incorporated in the graph produced by the graphing device, or that data is subtracted or withdrawn from the graph.

Herein means are provided for automatically actuating the graphing device in a manner to obtain the continuous indication of a trend in observed data, for example, in a manufacturing operation. To that end, there is shown in Fig. 4 the first means P comprising a gauging or checking mechanism *pa* and a classifying mechanism *pb* designed to energize selectively the solenoids 30 to advance corresponding fingers 14 successively and automatically as a series of articles to be measured are fed past the means P. Data thus obtained by the gauging mechanism *pa* in checking is by the classifying mechanism *pb* transformed into energization of the appropriate solenoids 30 to impart positive, additive or advancing movements to the fingers 14 to produce an initial curve. The second means M, likewise, comprises a gauging or checking mechanism *ma* and a classifying mechanism *mb*, and is connected selectively to operate the solenoids 31 to move the corresponding fingers in the opposite direction, that is, backwardly or retractive, to have the effect of subtracting or removing data from the graph as the articles are fed past the means M. The articles are fed past the two means P and M in the same order, but the first article is fed past the means M only after a given number have been fed past the means P, and this relationship is maintained at all times. Thus the graph at all times is made up of this given number of units of data. As additional articles are fed past the means P and M, new units of data will be incorporated in and old units of data removed from the graph which will thus continuously present the current distribution of the last given number of articles checked and thus the curent trend in the manufacturing operation.

Referring more particularly to the mechanism shown in outline in Fig. 4, the casing 10 of the graphing device is represented by a rectangle and the adding and subtracting solenoids 30 and 31 are designated P1—P7 and M1—M7, respectively. It will be assumed that the articles to be measured are wrist-pins or the like. They are adapted to be fed past the checking and data classifying means P and M each having a pivoted gauge arm 35 operating a switch lever or member 36 cooperating with fixed contacts 37, of the classifying mechanism, herein shown as seven in number. The contacts 37 of the means P are by leads *a1* to *a7* connected, respectively, to the solenoids P1—P7, while the contacts 37 of the means M are by leads *b1* to *b7* connected, respectively, to the solenoids M1—M7. The remainder of the circuits for the solenoids are as clearly shown in Fig. 4 and as hereinafter described. The articles are shown as being fed under the gauge arms 35 by an endless conveyor belt 38 adapted to be operated step-by-step by means of a sprocket chain 39 (Fig. 5) mounted on sprockets 40 and 41, shown in outline. The conveyor belt is shown as having uniformly spaced holder members 42 for carrying the articles or wrist-pins 43. The length of the upper run of the conveyor belt is long enough to permit spacing of the means P and M to such extent that within reasonable limits any desired given number of units of data may make up the graph.

The conveyor is shown as being connected to be driven step-by-step to bring the articles into their exact gauging positions under the respective gauge arms 35. The sprocket 40 is shown as being driven by a motor 44 through a reduction gearing 45 and this sprocket also carries cam members 46 spaced apart the same distance as are the holders 42 for the wrist-pins. The cams 46 are adapted to break the circuit to the motor periodically and stop the conveyor in the proper gauging positions. In this instance, the cams intermittently open a normally closed switch 47.

In this example, there is shown a master controller for the data classifying mechanism adapted to close the circuit to the conveyor motor and also to control the circuits to the adding and subtracting solenoids, so that, when the switch arms 36 are moved across the contacts 37, they will not close the circuits to all of the successive solenoids to which the contacts are electrically connected. For this purpose, there is shown a controlling motor 48 adapted to operate continuously when the machine is in use and it is connected through a reduction gear 49 to a shaft 50 carrying a series of cams 51, 52, 53 and 54. All of these cams are shaped to close normally open switches to control the circuits in proper sequence.

The switch cam 51 is shown as closing a switch 55 which is connected in circuit with the switch arm 36 of the subtracting means M and the series of solenoids M1—M7. The switch 55 closes after the motor controlling switch 47 is opened and the conveyor has stopped with one of its holder members 42, respectively, in gauging position at the means P and M. As here shown, the wrist pin 43 being gauged or checked by the means M has caused the arm 36 to be rotated to engage the fourth one of the contacts 37, considered in a clockwise direction as viewed in Fig. 4. The solenoid M4 is thus energized through the switch arm 36 and contact numbered 4, and it subtracts from the graph the data which was incorporated through energization of solenoid P4 when this same wrist pin passed the means P. Continued rotation of the cam will cause the switch 55 to open and another switch 56 to be closed by the cam 52 to complete the circuit through the adding means P and an appropriate one of the solenoids P1—P7, so that a new unit of data is additively incorporated in the graph to take the place of the subtracted unit of data and maintain constant the number of units of data composing the graph, and thus always produce a curve representing the last given number, herein one hundred wrist pins. In this instance, the circuit of solenoid P3 is closed through the arm 36 and contact numbered 3 and the measurement of wrist-pin number 101 will be added to the tabulator by rotating the screw shaft with which the solenoid P3 is associated.

After the measuring impulses are imparted to the indicating fingers 14 through the contacts, and the switches 55 and 56 are opened, the cam 54 closes a switch 57 in a circuit by-passing the conveyor motor switch 47. This bypass switch is held closed by the cam 54 until the cam 53 closes a second switch 58 completing the circuit to the motor 44. When this happens, the motor 44 will move the conveyor until the next cam 46 again opens the switch 47. At that time, the cam 54 has turned to permit the switch 57 to open and it remains open until the cycle is repeated. Thus, it will be seen that the cams control the circuits in the proper sequence and prevent any false measurement or impulse from being imparted to the solenoids in the graphing device. Of course, there are many other ways to control the circuits and it will be understood that the cam arrangement is illustrative of one relatively simple means for accomplishing this purpose.

In Figs. 6 and 7 there is shown an optical gauging system for controlling the circuits to energize the solenoids. This arrangement likewise employs a conveyor belt 38 like that shown in Figs. 4 and 5. However, the measuring finger 35' in this instance is connected to operate a plain mirror 59 mounted on a pivoted shaft 60. A source of light 61 is arranged to project rays through a lens 62 and a slit 63 in a plate 64 on the face of the mirror. The light thus projected is in the form of a wide ribbon or band and it is reflected by the mirror on the underside of a graduated, arcuate gauge glass 65. Also, a portion of the reflected light beam is directed into one of a series of light sensitive cells 66 arranged adjacent to the edge of the gauge glass and corresponding with the graduations thereon. Each one of these light sensitive cells may be described as corresponding with the contacts 37 in Fig. 4. They are connected to the respective solenoids through ordinary relays 67 in a manner well known to those skilled in the art, two such relay circuits being partially shown in Figs. 6 and 7.

The indicating fingers may be moved to their zero positions by a hand crank 68, geared to operate the individual screw shafts 18, through a series of friction clutches 69. These clutches 69 are normally disengaged and may be engaged by longitudinal shift of the frame 16 effected by lever 70 operatively associated with the frame for that purpose. Such shift of the frame simultaneously disengages the clutches 21, 22. The curve outlined by the indicating fingers 14 may at any time be recorded for a permanent record or for purposes of comparison with the curve at a later point in the operation. This may be readily done by placing over the chart face in the top plate of the casing, and over the heads 15 of the fingers 14 projecting through the chart, a carbon paper with the carbon face upwardly. On top of this there is placed a graph paper and this is then firmly pressed down by the hinged cover 71, which will press the papers firmly into contact with the heads 15 inasmuch as they are disposed slightly above the level of the chart face.

Having described the apparatus, the operation thereof will be generally described to aid in the appreciation of the manner in which the method and the apparatus of this invention function. Let it be assumed, therefore, as heretofore, that the desire is to supervise and control a manufacturing operation producing an object or article such as wrist pins whose diameter is to conform to certain limits. Under these conditions, the plus and minus tolerances will be subdivided into a plurality of equal ranges of the measure employed to designate the diameters of the wrist pins, usually, thousandths of an inch. One such range is then assigned to each of the ranges into which the lower edge 10b of the sub-depressed portion 10a of the top plate is divided, that is, to each of the slots 13 or to the fingers operating in those slots. Next the graphing device is through the medium of the crank 68 restored with all of the fingers 14 in zero position, and the means M is then so positioned relative to the means P that the desired given number of wrist pins will pass the means P before a wrist pin is presented to the means M. Let it be assumed herein that it is desired to have the graph composed of one hundred units of data, that is, that the means P, through the medium of the graphing device, produces a graph representing the measurement of one hundred wrist pins.

The wrist pins are in the order of their manufacture fed or placed on the conveyor 38 and the motor 48 started. The first wrist pin will thereupon be conveyed to a position at the means P where the measuring or checking mechanism $pa$ will determine the measurement of the wrist pin, and the classifying mechanism $pb$ will determine into which of the plurality of ranges the data so obtained falls and accordingly cause energization of the appropriate one of the solenoids P1—P7 to advance the corresponding finger 14. The conveyor will then advance one step, presenting a successive wrist pin to the means P and it will be measured, the data so obtained classified and an appropriate one of the solenoids P1—P7 energized to advance the corresponding finger 14. This will continue until one hundred wrist pins have passed the means P, with the result that a graph has been produced which is composed of one hundred units of data and may be considered as the basic or initial curve. At this time, it may be desirable to obtain, as above described, a record of the curve for later comparison or for a permanent record. However, it is contemplated that the first curve may be drawn on a piece of glass placed on the face of the machine and left there for comparative purposes, or some desired curve may be placed on that piece of glass.

With the next advance of the conveyor 38, the one hundred and first wrist pin is presented to the means P, while at the same time the first wrist pin is presented to the means M. As previously described in greater detail, the means M functions first to measure the wrist pin, classify the data obtained, and cause removal of that unit of data from the graph by retraction of the appropriate finger 14. Next the means P functions to incorporate in the graph the new data obtained by measurement of the one hundred and first wrist pin, so that there will again be exactly one hundred units of data composing the graph. It is important, of course, that the units of data be subtracted or removed from the graph in the order in which they are incorporated in the graph, in order that the graph may constantly represent the latest given number, herein one hundred wrist pins checked. Thus the apparatus continues by presenting to the means M the second wrist pin, while there is presented to the means P the one hundred and second wrist pin, and so on throughout the manufacturing operation, or as long as desired. The graph, therefore, constantly is an expression of the current distribution of the wrist pins with respect to the specified diameter. By comparison, therefore, of the true average value, that is, the line through the apex of the curve parallel with the ordinate axis, or by comparison of the ordinate value for some particular abscissa value with the basic or initial graph, or any previous graph, a trend in the manufacturing operation, if present, will quickly be indicated. While it is preferable to convey each article manufactured past the means P and the means M as here described, it is contemplated by the invention that at times it may be expedient to check on the manufacturing operation by conveying only certain of the articles past the means such, for example, as every fifth, tenth or one hundredth article.

From the foregoing description, it will be seen that the method and apparatus are relatively simple. They permit the detection of trends in sampling data at a time when algebraic averages may be misleading. In the case of production methods of a more or less uniform nature, the machine permits the prediction of the percentage of rejects in many cases before such rejects occur in great numbers. It permits a comparison of the performance of individual operations, machines and manufacturing processes, thereby enabling efficiency experts to make records which at present are very difficult to obtain. The machine can be operated automatically and the results obtained to avoid normal rejects by stopping processes or operations when the trend of the variations from the desired values indicates the danger of an inordinate increase in the percentage of rejects. By continuous supervision of processes or production methods, the machine permits closer tolerances in cases where variations have been less than expected. It also permits changes in tolerances within permissive limits, without increasing the production cost. It is contemplated that such machines and the method will become indispensable aids in business and industrial management, because of the easy determination of shifts in distribution of data or trends when algebraic averages would be misleading.

Obviously, the invention is not limited to the particular mechanism herein shown and described. Moreover, the method is not dependent upon any particular apparatus.

What is claimed is:

1. Indicating apparatus of the character described comprising, in combination, a graphing device including a casing having a coordinate axis chart face; indicating members equally spaced along the abscissa axis and movable parallel with the ordinate axis having heads exposed on the chart face; screw members for actuating the indicating members to produce the outline of a graph representing characteristics of data; pairs of adding and subtracting solenoids associated with each of the screw members to impart actuating movements in either direction in accordance with the characteristics of data to be investigated; automatic means for measuring characteristics of variable specimens to be investigated and energizing the adding solenoids in accordance with such measurements to produce a graph; and associated means for energizing the subtracting solenoids after the characteristics of a predetermined number of specimens have been added, whereby continued operation will add and subtract impulses as additional specimens are measured.

2. Indicating apparatus of the character described comprising, in combination, a graphing device having a chart face and a plurality of indicating members exposed thereon to produce the outline of a graph representing characteristics of data; means for imparting step-by-step movement in either direction to the members, including pairs of adding and subtracting solenoids; means to energize the adding solenoids intermittently to impart movements to the members representing the characteristics of a predetermined number of articles; and means to energize the subtracting solenoids to subtract movements from the actuated members as additional movements are imparted after the predetermined number of articles is tabulated, so that the graph will represent the distribution of the same predetermined number of articles after the first group is tabulated.

3. Indicating apparatus of the character described comprising, in combination, a graphing device including a casing having a chart face presenting a plurality of parallel slots; indicating fingers projecting through the slots and exposed on the chart face to produce the outline of a graph representing the characteristics of articles undergoing investigation; screw members for actuating the fingers; pairs of adding and subtracting solenoids connected to operate the screw members step-by-step in either direction; an endless conveyor having spaced supports for the articles; spaced adding and subtracting gauges above the conveyor arranged to measure the articles; means to operate the conveyor step-by-step to stop the articles in their gauging positions; and circuit controlling means for the solenoids connected and arranged to impart adding and subtracting impulses to the fingers corresponding with the gauge measurements after a predetermined number of articles have been fed past the adding gauge, whereby the fingers will display the outline of a graph always representing the frequency distribution of the investigated characteristic of the same number of articles.

4. Indicating apparatus of the character set forth in claim 3, wherein the circuit control means includes separate cams for the adding and subtracting solenoids; and control mechanism for operating the conveyor step-by-step in proper sequence.

5. Indicating apparatus as set forth in claim 3, wherein the gauges include an optical system and light sensitive cells for closing the circuits to the respective solenoids.

6. Indicating apparatus as set forth in claim 3, wherein the gauges include an optical system; transparent scale members to indicate the measured characteristics of the articles; and light sensitive cells and relays connected to energize the respective solenoids in accordance with the measured characteristics.

7. Apparatus for continuously indicating a trend in a manufacturing operation designed for the production of a uniform product required to have at least one characteristic fall within specified limits comprising, in combination, means presenting for checking units of the product in the order of completion, a first means checking each unit of the product presented as to the particular characteristic, said first means automatically classifying the data so obtained and indicating into which one of a plurality of equal ranges of a measure of the characteristic the data falls, mechanical graphing means automatically actuated by said classifying means additively incorporating the data in a graph, and a second checking and classifying means coming into operation after a given number of units of the product have been checked by said first means and operatively associated with said graphing device automatically and successively to subtract from the graphing device the data obtained by said first means, such subtraction of data occurring one for each addition above the given number of units of the product and occurring in the order of addition of the data.

8. Apparatus for continuously indicating a trend in a manufacturing operation designed for the production of a uniform product required to have at least one characteristic fall within specified limits comprising, in combination, a mechanical graphing device having a plurality of indicators uniformly spaced along an axis representing one of the axes of a coordinate axis graph, with each indicator representing the midpoint of a plurality of equal ranges of a measure of the particular characteristic to be observed, said indicators being movable in parallel lines normal to the first named axis, a first product checking and data classifying means operatively associated with said graphing device to advance from zero and step-by-step the appropriate one of said indicators, a second product checking and data classifying means operatively associated with said graphing device automatically to retract step-by-step toward zero the appropriate one of said indicators, and means for presenting to said checking and classifying means units of the product in the order of their manufacture, with the units presented to said second checking and classifying means only after a number of units sufficient to produce a graph have already been presented to said first checking and classifying means.

9. Apparatus for continuously indicating a trend in a manufacturing operation designed for the production of a uniform product required to have at least one characteristic fall within specified limits comprising, in combination, a mechanical graphing device having a plurality of indicators uniformly spaced in one direction parallel with a line representing the abscissa axis of a coordinate axis graph and with each indicator representing the midpoint of a plurality of equal ranges of a measure of the particular characteristic to be observed, said indicators being movable in parallel lines normal to the first named line to represent ordinate values for the given abscissa divisions, a first means including mechanism for obtaining a measurement of the product as to the characteristic to be observed, mechanism for classifying the data so obtained and indicating into which one of the plurality of equal ranges of a measure of the characteristic the data falls, and mechanism for translating the action of the classifying mechanism into an advance of the appropriate one of said indicators, a second means including mechanism for obtaining a measurement of the product as to the characteristic to be observed, mechanism for classifying the data so obtained and indicating into which one of the plurality of equal ranges of a measure of the characteristic the data falls, and mechanism for translating the action of the classifying mechanism into a retraction of the appropriate one of said indicators and means for presenting to said first and second means the products to be checked in the order of their manufacture with the products presented to said second means only after a given number of products have already been presented to said first means.

10. Apparatus for continuously indicating a trend in a manufacturing operation designed for the production of a uniform product required to have at least one characteristic fall within specified limits comprising, in combination, a mechanical graphing device having a plurality of indicators uniformly spaced in one direction parallel with a line representing the abscissa axis of a coordinate axis graph and with each indicator representing the midpoint of a plurality of equal ranges of a measure of the particular characteristic to be observed, said indicators being movable in parallel lines normal to the first named line to represent ordinate values for the given abscissa divisions, and a pair of solenoids operatively associated with each indicator, energization of one of said solenoids advancing its indicator a predetermined amount and energization of the other solenoid retracting the indicator the same amount, a first means including mechanism for obtaining a measure of the product as to the particular characteristic to be observed and mechanism classifying the data so obtained and causing energization of the one of said solenoids for advancing the appropriate indicator, a second means including mechanism for obtaining a measure of the particular characteristic to be observed and mechanism for classifying the data so obtained and causing energization of the one of said solenoids to effect retraction of the appropriate indicator, and means for presenting to said first and second means the products to be checked in the order of their manufacture with the products presented to said second means only after a given number of products have been presented to said first means, the presentation of the products to said first and second means being at the same rate so as to maintain the graph produced by said mechanical graphing device composed of data obtained from the checking of a given number of products.

11. Apparatus for continuously indicating a trend in a manufacturing operation designed for the production of a uniform product required to have at least one characteristic fall within specified limits comprising, in combination, a mechanical graphing device having a plurality of indicators uniformly spaced in one direction parallel with a line representing the abscissa axis of a coordinate axis graph and with each indicator representing the midpoint of a plurality of equal ranges of a measure of the particular characteristic to be observed, said indicators being movable in parallel lines normal to the first named line to represent ordinate values for the given abscissa division, means for conveying products to be checked in the order of their manufacture, a product checking and data classifying means acting on the products as they are conveyed thereto and operatively associated with said graphing device selectively to advance said indicators in accordance with the classification given the data obtained by checking by said classifying means, and means operable in timed relationship with the incorporation of new units of data into the graph produced by said graphing device to remove from the graph the data incorporated therein in the order of incorporation, said last mentioned means coming into play only after a given number of units of data have been incorporated in the graph.

12. Apparatus for continuously indicating a trend in observed data relating to a common but variable characteristic comprising, in combination, means presenting the observed data in the order of observation, a first classifying means automatically classifying the data and indicating into which one of a plurality of equal ranges of a measure of the characteristic the data falls, mechanical graphing means automatically actuated by said classifying means additively incorporating the data in a graph, and a second classifying means coming into operation after a given number of units of data have been incorporated in the graph by said mechanical graphing means and operatively associated with said graphing means automatically and successively to subtract from the graph the data added by said first classifying means, such subtraction of data occurring one for each addition above the given number and occurring in the order of addition of the data.

13. Apparatus for continuously indicating a trend in observed data relating to a common but variable characteristic comprising, in combination, a mechanical graphing device having a plurality of indicators uniformly spaced in one direction parallel with a line representing the abscissa axis of a coordinate axis graph and with each indicator representing the midpoint of a plurality of equal ranges of a measure of the particular characteristic to be observed, said indicators being movable in parallel lines normal to the first named line to represent ordinate values for the given abscissa divisions, a first data classifying means operatively associated with said graphing device selectively to advance said indicators in accordance with the classification given to the data supplied to said means, a second data classifying means operatively associated with said graphing device selectively to retract said indicators in accordance with the classification of the data supplied to said second classifying means, and means for presenting data in the order of observation first to said first classifying means and thereafter to said second classifying means at the same rate and in the same order with the data presented to said second classifying means only after a given number of units of data have been presented to said first classifying means.

14. Apparatus for continuously indicating a trend in a manufacturing operation designed for the production of a uniform product required to have at least one characteristic fall within specified limits comprising, in combination, means presenting for checking units of the product in the order of completion, a first means checking each unit of the product presented as to the particular characteristic and indicating whether the data so obtained falls in a certain range of a measure of the characteristic, said range being chosen to lie within the specified limits, registering means automatically actuated in one direction by said first means when the data obtained falls in said certain range, and a second checking means coming into operation after a given number of units of the product have been checked by said first means, said second checking means automatically actuating said registering means in the opposite direction from said first means whenever the data so obtained by said second checking means falls in said certain range.

15. Apparatus for continuously indicating a trend in a manufacturing operation designed for the production of a uniform product required to have at least one characteristic fall within specified limits comprising, in combination, means presenting for checking units of the product in the order of completion, a first means checking each unit of the product presented as to the particular characteristic, a second means, coming into operation after a given number of units of the product have been checked by said fir means, also checking each unit of the product presented as to the particular characteristic, and means for indicating the number of units falling within a certain range of a measure of the characteristic, said first and said second means being operatively associated with said last mentioned means, said first means to increase and said second means to decrease the indication of the number of units falling in said certain range as units falling in that range are checked thereby to obtain a continuously changing indication utilizable to predict a trend in a manufacturing operation.

16. Apparatus for continuously indicating a trend in observed data relating to a common but variable characteristic comprising, in combination, means presenting the observed data in the order of observation, a first data classifying means, a second data classifying means coming into operation after a given number of units of data have been classified by said first means also classifying each unit of data, and means for indicating the number of units of data falling within a certain range of a measure of the characteristic being observed, said first and said second data classifying means being operatively associated with said last mentioned means, said first means to increase and said second means to decrease the indication by said last mentioned means of the number of units of data falling in said certain range as units of data falling in that range are presented to said classifying means, thereby to obtain a continuously changing indication utilizable to predict a trend in the characteristic being observed.

HERBERT ZIEBOLZ.